United States Patent
Colven (10) Patent No.: US 9,647,893 B2
(45) Date of Patent: May 9, 2017

(54) METHOD FOR IDENTIFYING LOGICAL LOOPS IN ETHERNET NETWORKS

(71) Applicant: David Michael Colven, Dallas, TX (US)

(72) Inventor: David Michael Colven, Dallas, TX (US)

(73) Assignee: Fujisul Limited, Kawasaki (JP)

(*) Notice: Subject to any disclaimer, the term of this patent is extended or adjusted under 35 U.S.C. 154(b) by 87 days.

(21) Appl. No.: 14/444,165

(22) Filed: Jul. 28, 2014

(65) Prior Publication Data

US 2016/0028588 A1 Jan. 28, 2016

(51) Int. Cl.
*H04L 12/24* (2006.01)
*H04L 12/437* (2006.01)
*H04L 12/42* (2006.01)
*H04L 12/433* (2006.01)
*H04L 12/46* (2006.01)

(52) U.S. Cl.
CPC .............. *H04L 41/12* (2013.01); *H04L 12/42* (2013.01); *H04L 12/437* (2013.01); *H04L 12/433* (2013.01); *H04L 12/4637* (2013.01)

(58) Field of Classification Search
CPC ..... H04L 12/433; H04L 12/42; H04L 12/423; H04L 12/437; H04L 12/4637; H04L 41/12

See application file for complete search history.

(56) References Cited

U.S. PATENT DOCUMENTS

| | | | |
|---|---|---|---|
| 7,804,788 B2* | 9/2010 | Fujii | H04L 12/437 370/254 |
| 9,264,327 B2* | 2/2016 | Koide | H04L 43/0805 |
| 2004/0103179 A1* | 5/2004 | Damm | H04L 12/1886 709/223 |
| 2009/0198807 A1* | 8/2009 | Bailey | H04L 12/40039 709/223 |
| 2010/0135154 A1* | 6/2010 | Cheung | H04L 12/4625 370/223 |
| 2010/0165883 A1* | 7/2010 | Holness | H04L 45/28 370/255 |
| 2011/0222396 A1* | 9/2011 | Tochio | H04L 12/437 370/222 |
| 2011/0292837 A1* | 12/2011 | Nakamura | H04L 12/2602 370/256 |
| 2012/0195233 A1* | 8/2012 | Wang | H04L 41/12 370/258 |
| 2012/0294186 A1* | 11/2012 | Gloss | H04L 12/2673 370/253 |

(Continued)

OTHER PUBLICATIONS

G. Bosco ct al., "Performance Limits of Nyquist-WDM and Co-OFDM in High-Speed PM-QPSK Systems", IEEE Photonics Technology Letters, vol. 22, No. 15, pp. 1129-1131, Aug. 1, 2010.

*Primary Examiner* — Parth Patel
*Assistant Examiner* — Kai Chang
(74) *Attorney, Agent, or Firm* — Baker Botts L.L.P.

(57) ABSTRACT

A method and system for identifying logical loops in an Ethernet network may determine a number of nodes N and a number of links L between nodes. A number of rings R, including a number of major rings and a number of sub-rings for the Ethernet network may be determined. Specific formulas for the values for L, R, and N may be evaluated to determine when the Ethernet network includes logical loops.

3 Claims, 7 Drawing Sheets

(56) References Cited

U.S. PATENT DOCUMENTS

| | | | |
|---|---|---|---|
| 2013/0044588 A1* | 2/2013 | Kogge | H04L 12/42 370/223 |
| 2013/0315580 A1* | 11/2013 | Boertjes | H04J 14/0204 398/5 |
| 2014/0169223 A1* | 6/2014 | Kampmann | H04L 12/437 370/258 |
| 2014/0211664 A1* | 7/2014 | Peng | H04L 45/507 370/257 |
| 2015/0117267 A1* | 4/2015 | Lih | H04L 12/437 370/258 |
| 2015/0271050 A1* | 9/2015 | Zhang | H04L 45/02 370/255 |

* cited by examiner

400 — FIRST EXAMPLE OF LOGICAL LOOP IDENTIFICATION

FIG. 4

FIG. 5A — SECOND EXAMPLE OF LOGICAL LOOP IDENTIFICATION

FIG. 5B — SECOND EXAMPLE OF LOGICAL LOOP IDENTIFICATION

FIG. 5C — SECOND EXAMPLE OF LOGICAL LOOP IDENTIFICATION

FIG. 5D — SECOND EXAMPLE OF LOGICAL LOOP IDENTIFICATION

METHOD FOR IDENTIFYING LOGICAL LOOPS IN ETHERNET NETWORKS

BACKGROUND

Field of the Disclosure

The present disclosure relates to communications systems and more specifically to identifying logical loops in Ethernet networks.

Description of the Related Art

A communication network may include network elements that route packets through the network. The communication network may be an Ethernet network.

In the G.8032 Recommendation promulgated by the International Telecommunication Union Telecommunication Standardization Sector (ITU-T), Ethernet ring network protection switching (ERPS) is described with the aim of fast protection switching for ring topologies having physical loops while ostensibly avoiding logical loops at the Ethernet layer. Logical loops adversely affect network performance and operation and are undesirable for Ethernet networks. Specifically, G.8032 avoids logical loops in an Ethernet ring network by reserving so-called Ring Protection Links (RPL), which are linked to an RPL Owner Node and an RPL Neighbor Node at each end of the ring. When the Ethernet ring network is operating normally, RPLs block network traffic to avoid logical loops from forming. When an associated physical link in the Ethernet ring network fails, the RPL is activated to transmit (i.e., unblock) network traffic by the RPL Owner Node or the RPL Neighbor Node.

However, despite the G.8032 protocol, configurations of Ethernet ring networks with RPLs may still contain logical loops in certain allowable configurations, which is undesirable.

SUMMARY

In one aspect, a disclosed method for identifying logical loops in an Ethernet network may include determining a number of nodes N included in the Ethernet network, determining a number of links L included in the Ethernet network, wherein a link is a direct physical connection between two nodes, and determining a number of rings R included in the Ethernet network, wherein the number of rings R includes a number of major rings and a number of sub-rings. The method may further include evaluating a first formula for the Ethernet network given by: $L \leq (2N-3)$, and evaluating a second formula for the Ethernet network given by: $R \leq (N-2)$. When the number of rings R indicates at least one major ring and at least one of the first formula and the second formula is not satisfied, the method may include determining that the Ethernet network includes at least one logical loop.

In certain embodiments, the method may include evaluating a formula for the Ethernet network, given by: $L \leq R + (N-1)$. When the number of rings R indicates at least one major ring and the formula is not satisfied, the method may include determining that the Ethernet network includes at least one logical loop.

Additional disclosed aspects for identifying logical loops in an Ethernet network include a system comprising a processor configured to access non-transitory computer readable memory media, and an article of manufacture comprising non-transitory computer readable memory media storing processor-executable instructions.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

Figure 1:
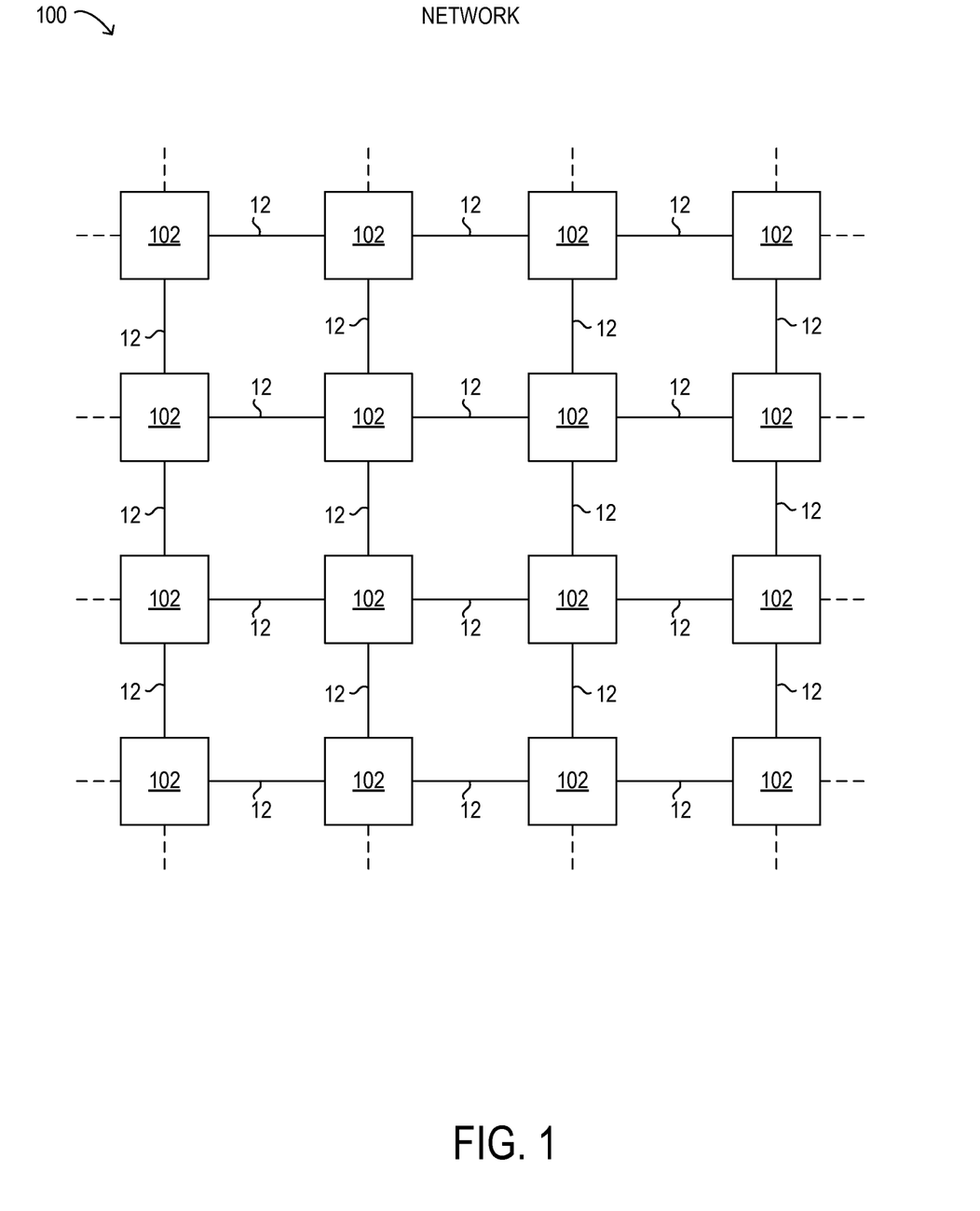
FIG. 1 is a block diagram of selected elements of an embodiment of a network.

Turning now to the drawings, FIG. 1 is a block diagram showing selected elements of an embodiment of network 100. In various embodiments, network 100 may be an Ethernet network. Network 100 includes one or more transmission media 12 operable to transport one or more signals communicated by components of network 100. The components of network 100, coupled together by transmission media 12, include a plurality of network elements 102. In the illustrated network 100, each network element 102 is coupled to four other nodes. However, any suitable configuration of any suitable number of network elements 102 may create network 10. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, and/or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

During operation or design of network 100, or a particular topology associated with network 100, certain criteria may be applied to identify whether any logical loops are able to form in network 100. Specifically, the inventor of the present disclosure has discovered that even when network 100 is an Ethernet network that complies with the G.8032 recommendation, certain configurations of network 100 may still result in logical loops, which is undesirable for routing traffic across network 100. Thus, the following formulas have been derived for purposes of logical loop identification:

$$L \leq (2*N-3) \qquad \text{Formula (1)}$$

$$R \leq (N-2) \qquad \text{Formula (2)}$$

In Formulas 1 and 2, N is a number of nodes in the network being analyzed, L is a number of direct links between the nodes, and R is a number of rings in the network. The number of rings R includes a number of major rings and a number of sub-rings. A major ring includes at least three nodes and at least three links, while a sub-ring includes at least three nodes and at least two links (see also FIG. 3). Thus according to G.8032 a ring included in the number R includes at least two links, in order to support at least one RPL per ring. Furthermore, the number of rings R includes at least one major ring for G.8032 compliance. When the network does not satisfy at least one of Formulas 1 and 2, it may be determined that the network includes a logical loop (see FIG. 6).

Alternatively, in certain embodiments, another formula may be used for logical loop identification.

$$L \leq R+(N-1) \qquad \text{Formula (3)}$$

Figure 7:
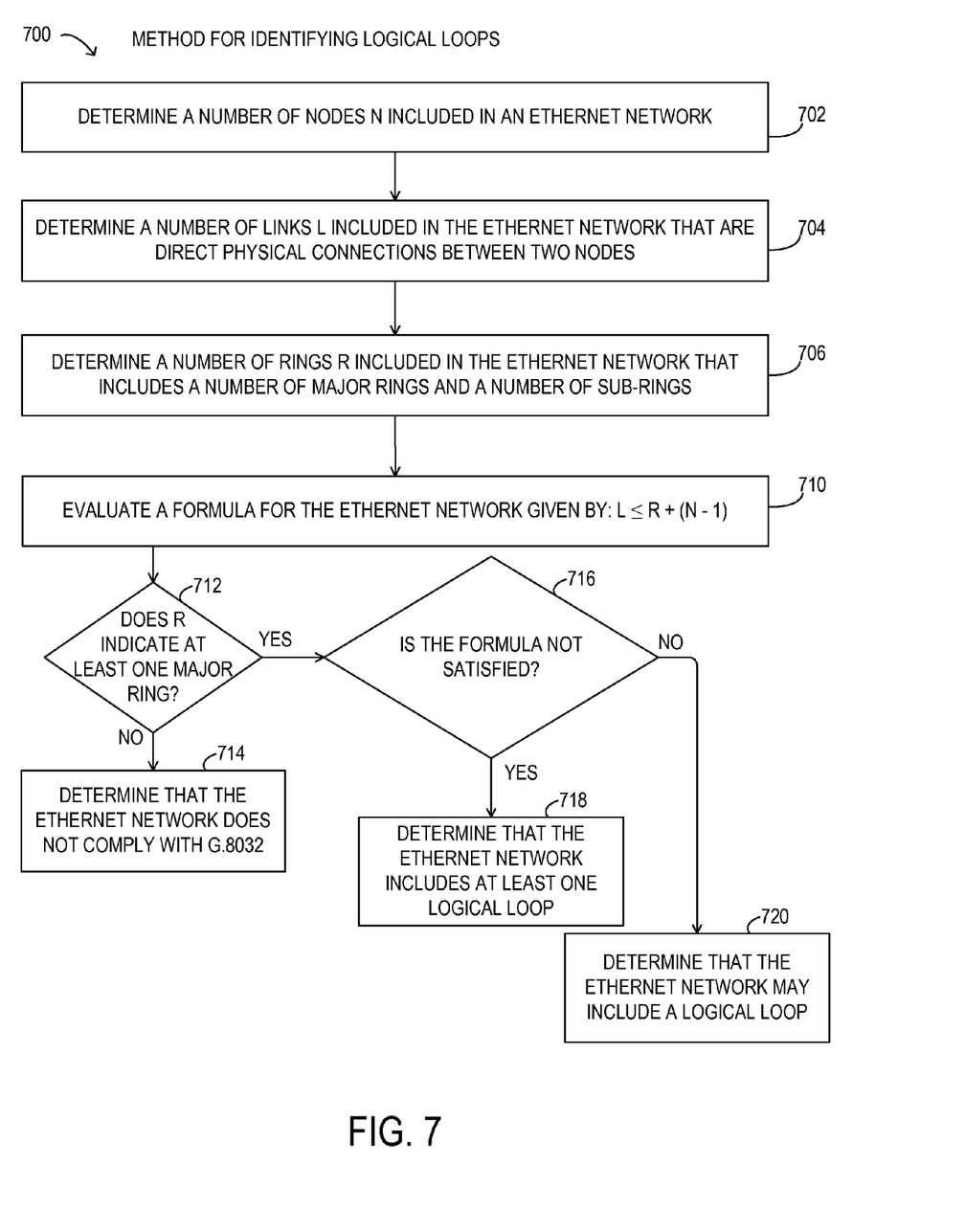
FIG. 7 is a flow chart of selected elements of a method for identifying logical loops.

When Formula 3 is not satisfied, it may be determined that the network includes a logical loop (see FIG. 7).

Figure 2:
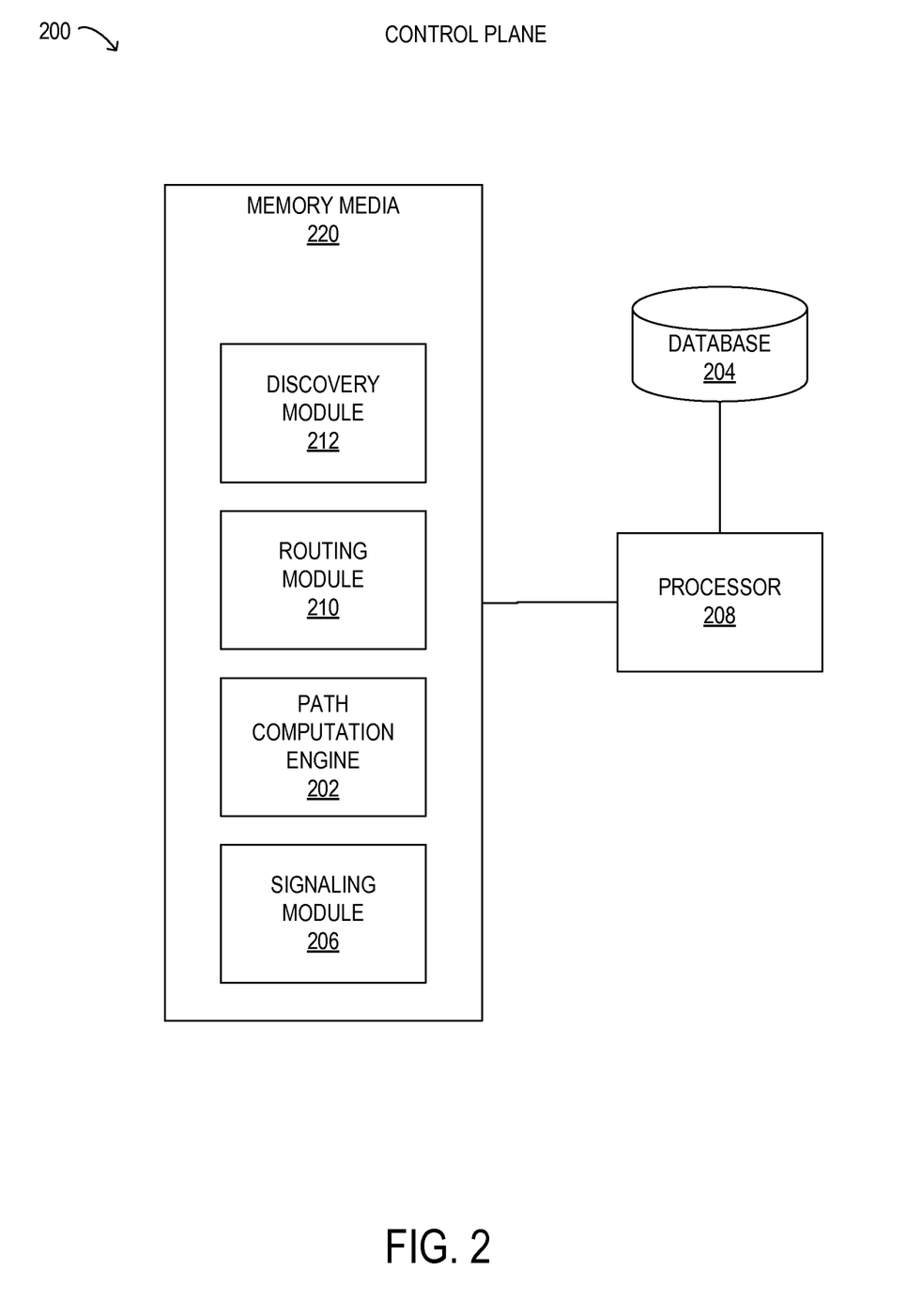
FIG. 2 is a block diagram of selected elements of a control plane.

Turning now to FIG. 2 a block diagram of selected elements of an embodiment of control plane 200 for implementing control plane functionality in networks, such as, for example, in network 100 (see FIG. 1), is illustrated. A control plane includes functionality for network intelligence and control and comprises applications that support the ability to establish network services, including applications or modules for discovery, routing, path computation, and signaling, as will be described in further detail. The control plane applications executed by control plane 200 work together to automatically establish services within network 100, which may be at least in part an optical network. Discovery module 212 discovers local links connecting to neighbors. Routing module 210 broadcasts local link information to network nodes while populating database 204. When a request for service from network 100 is received, path computation engine 202 may be called to compute a network path using database 204. This network path may then be provided to signaling module 206 to establish the requested service.

As shown in FIG. 2, control plane 200 includes processor 208 and memory media 220, which store executable instructions (i.e., executable code) executable by processor 208, which has access to memory media 220. Processor 208 may execute instructions that cause control plane 200 to perform the functions and operations described herein. For the purposes of this disclosure, memory media 220 may include non-transitory computer-readable media that stores data and/or instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. In some embodiments, path computation engine 202, in conjunction with signaling module 206, discovery module 212, and/or routing module 210, may represent instructions and/or code for implementing various algorithms according to the present disclosure.

In certain embodiments, control plane 200 may be configured to interface with a person (i.e., a user) and receive data about the signal transmission path. For example, control plane 200 may also include and/or may be coupled to one or more input devices and/or output devices to facilitate receiving data about the signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, control plane 200 may be configured to receive data about the signal transmission path from a device such as another computing device and/or a network element (not shown in FIG. 2).

As shown in FIG. 2, in some embodiments, discovery module 212 may be configured to receive data concerning a signal transmission path in a network and may be responsible for discovery of neighbors and links between neighbors. In other words, discovery module 212 may send discovery messages according to a discovery protocol, and may receive data about the signal transmission path. In some embodiments, discovery module 212 may determine features, such as, but not limited to, media type; media length; number and/or type of components; data rate; modulation format of the data; input power of an optical signal; number of optical signal carrying wavelengths (i.e., channels); channel spacing; traffic demand; and/or network topology, among others.

As shown in FIG. 2, routing module 210 may be responsible for propagating link connectivity information to various nodes within a network, such as network 100. In particular embodiments, routing module 210 may populate database 204 with resource information to support traffic engineering, which may include link bandwidth availability. Accordingly, database 204 may be populated by routing module 210 with information usable to determine a network topology of a network.

Path computation engine 202 may be configured to use the information provided by routing module 210 to database 204 to determine transmission characteristics of the signal transmission path. The transmission characteristics of the signal transmission path may provide insight on how transmission degradation factors may affect the signal transmission path. When the network is an optical network, the transmission degradation factors may include, for example: chromatic dispersion (CD), nonlinear (NL) effects, polarization effects, such as polarization mode dispersion (PMD) and polarization dependent loss (PDL), amplified spontaneous emission (ASE) and/or others, which may affect optical signals within an optical signal transmission path. To determine the transmission characteristics of the signal transmission path, path computation engine 202 may consider the interplay between various transmission degradation factors. In various embodiments, path computation engine 202 may generate values for specific transmission degradation factors. Path computation engine 202 may further store data describing the signal transmission path in database 204.

In FIG. 2, signaling module 206 may provide functionality associated with setting up, modifying, and tearing down end-to-end networks services in network 100. For example, when an ingress node in the optical network receives a service request, control plane 200 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation, control plane 200 may be used to detect or determine nodes, links, and rings within an Ethernet network. The Ethernet network may be an existing network, such that control plane 200 communicates with network elements. In other instances, control plane 200 may process network information for a proposed network or a network design that represents a virtual network. After determination of respective numbers of the nodes, links, and rings within the Ethernet network, control plane 200 may be used to apply any one of Formulas 1 and 2, or Formula 3, according to the methods described herein, and to identify whether logical loops are present in the Ethernet network. Control plane 200 may also be used to determine whether an Ethernet network complies with the G.8032 recommendation.

According to G.8032, a non-degenerate Ethernet ring that provides link protection includes at least three Ethernet ring nodes, such that an Ethernet ring node is linked to at least two neighboring Ethernet ring nodes respectively with at least two independent ring links, which provides for link protection (i.e., redundancy) when an operating link fails. The ring links are configured using RPLs to prohibit formation of logical loops that are undesirable in an Ethernet network due to uncontrollable traffic forwarding that may occur over the logical loops. The rings may be major rings that are configured as a physical loop with at least three nodes and at least three independent ring links. As noted previously, an Ethernet network conforming with G.8032 will have at least one major ring. The rings may also include so-called 'sub-rings' having at least three nodes and at least two independent ring links.

The ring topology may be used to interconnect different Ethernet networks. For example, two Ethernet networks consisting of major rings may be interconnected using a single common node. However, such a topology is undesirable because the common node is a single point of failure for both the connected Ethernet networks, which increases risks of failure and also amplifies the impact of a failure of the common node. Under G.8032, a sub-ring may be connected to a major ring or another sub-ring using two common nodes, thereby enabling link protection at the two common nodes.

The RPLs are redundant links that form a physical loop but are blocked according to G.8032 to prevent a logical loop from forming. Under G.8032, the RPL may be in one of two states: idle and protecting. The idle state represents normal operation when the RPL is blocked and does not forward traffic, even though the physical link at the RPL is present. The idle state may indicate that no link or node faults are currently detected and that the network is operating normally. The protecting state represents a network condition to recover from a link error where the RPL is activated and forwards traffic. Thus, when an RPL is active, it may be assumed that another link in the network has failed.

Figure 3A:
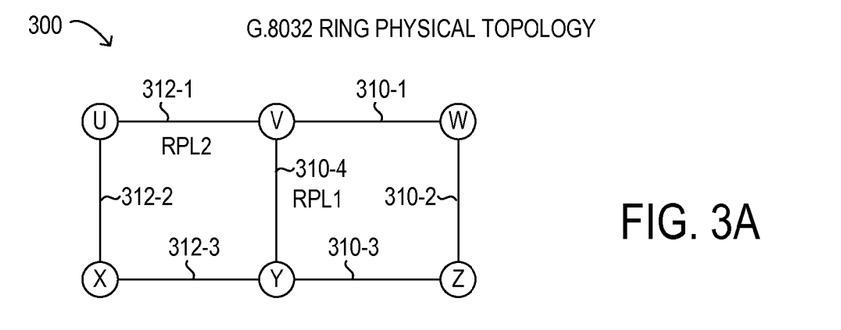
FIG. 3A is a network diagram of selected elements of a physical topology for a G.8032 ring network.

Referring now to FIG. 3A, a network diagram of selected elements of physical topology 300 for a G.8032 ring network is illustrated. As shown, physical topology 300 may represent an embodiment of network 100. In FIG. 3A, physical topology 300 includes nodes U, V, W, X, Y, Z and physical links 312, 310 in an Ethernet network. In physical topology 300, nodes V, W, Z, Y are a major ring that includes links 310-1, 310-2, 310-3, and 310-4. Nodes V, U, X, Y are a sub-ring connected to the major ring at nodes V and Y that includes links 312-1, 312-2, and 312-3. As will be described below with respect to FIGS. 3B, and 3C, link 310-4 may be configured as an RPL (RPL1) for the major ring, while link 312-1 may be configured as an RPL (RPL2) for the sub-ring. Because logical loops would result, physical topology 300 is not usable as a logical topology for an Ethernet network.

Figure 3B:
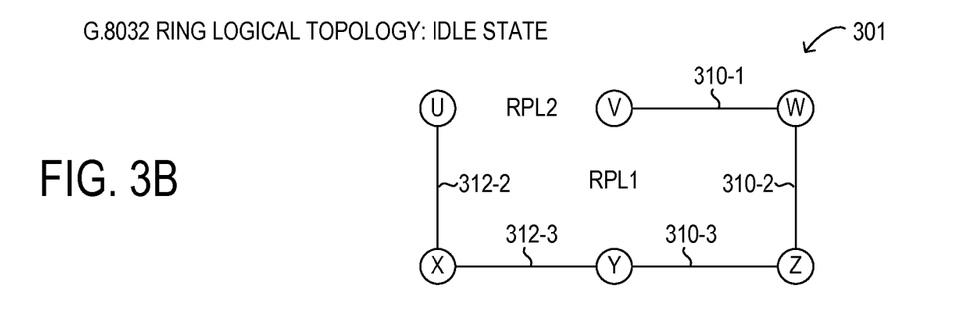
FIG. 3B is a network diagram of selected elements of a logical topology for a G.8032 ring network in an idle state.

Referring now to FIG. 3B, a network diagram of selected elements of logical topology 301 is illustrated. As shown, logical topology 301 may represent an idle state of physical topology 300 (see FIG. 3A). Specifically, logical topology 301 shows links for RPL1 and RPL2 each in an idle state and blocked for network traffic, leaving nodes U-X-Y-Z-W-V connected in a linear topology (i.e., a spanning tree that does not include logical loops) that is suitable for Ethernet network operation.

Figure 3C:
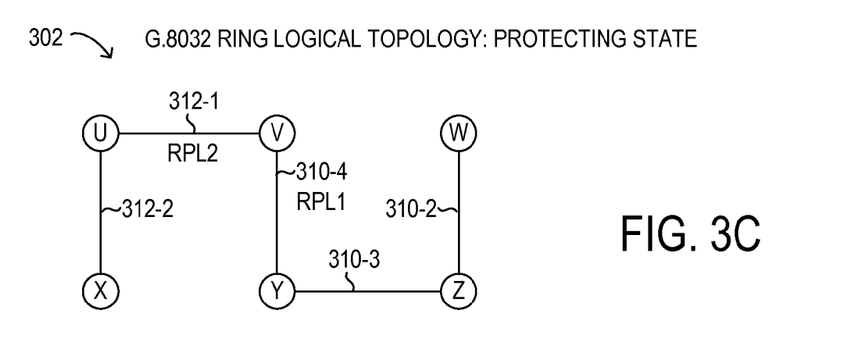
FIG. 3C is a network diagram of selected elements of a logical topology for a G.8032 ring network in a protection state.

Referring now to FIG. 3C, a network diagram of selected elements of logical topology 302 is illustrated. As shown, logical topology 302 may represent a protection state of physical topology 300 (see FIG. 3A), where links 310-1 and 312-3 have failed. Logical topology 302 shows links for RPL1 and RPL2 each in a protection state and transmitting network traffic, leaving nodes X-U-V-Y-Z-W connected in a linear topology (i.e., a spanning tree that does not include logical loops) that is suitable for Ethernet network operation. Although a dual failure for the major ring and the sub-ring are illustrated in FIG. 3B for descriptive clarity, it will be understood that RPL1 or RPL2 may individually respond to a failure and operate independently of one another in the protecting state.

Figure 4:
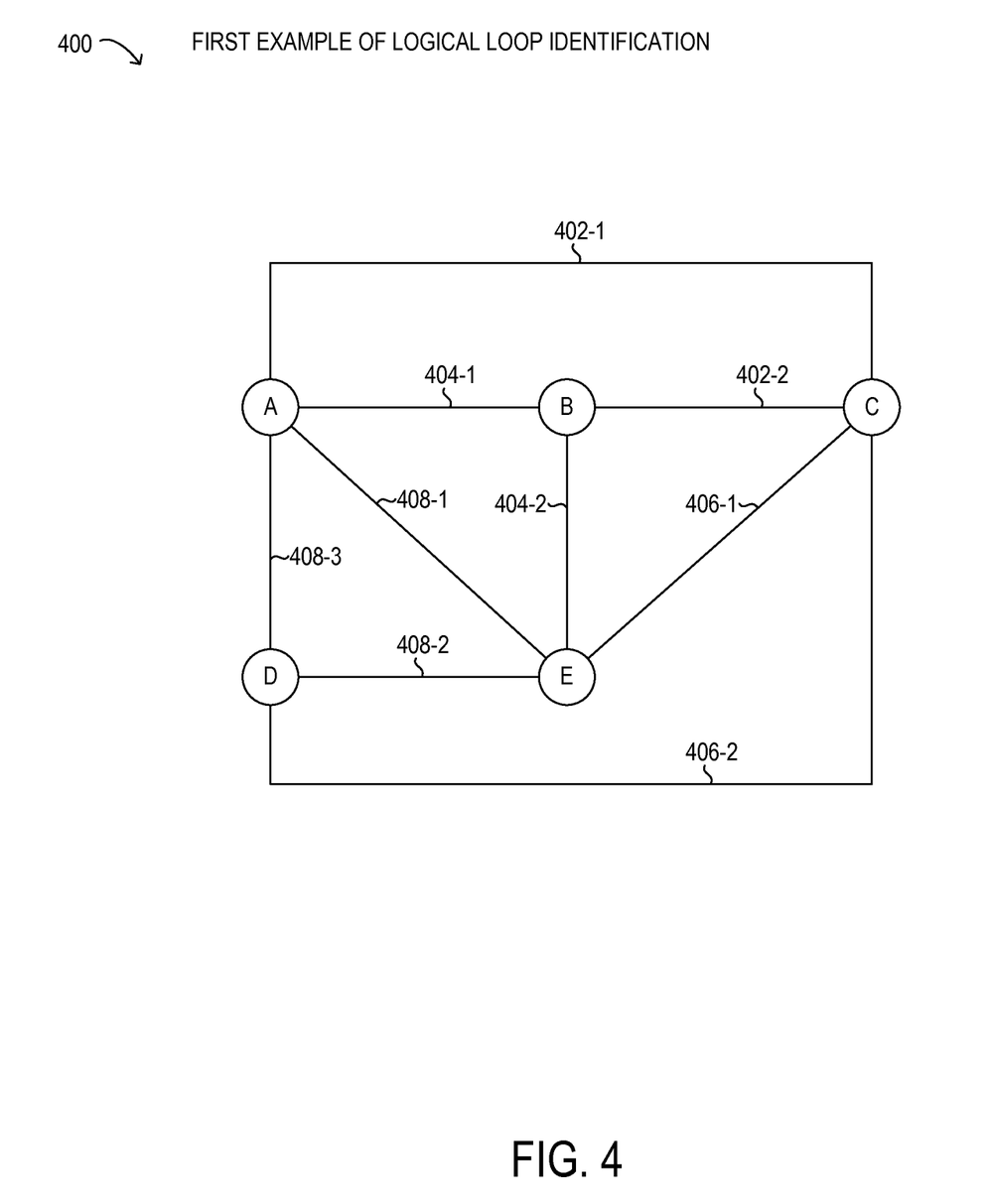
FIG. 4 is a network diagram of selected elements of a first example of logical loop identification.

Referring now to FIG. 4, a network diagram of selected elements of a first example 400 of logical loop identification is depicted. As shown, first example 400 may represent an embodiment of network 100. In first example 400, five nodes (A, B, C, D, E) represent network nodes and, thus, N=5. Also, nine (9) physical links (402-1, 402-2, 404-1, 404-2, 406-1, 406-2, 408-1, 408-2, 408-3) are present between the 5 nodes, and so, L=9. In first example 400, the physical links have been configured in an exemplary logical topology as G.8032 rings, whose logical operation is described above with respect to FIGS. 3A, 3B, and 3C. The configuration of the physical links is described below for the exemplary logical topology shown in FIG. 4. It will be understood that other logical topologies may be implemented in different embodiments.

A major ring logically configured to connect nodes A-D-E is indicated by links 408. A first sub-ring logically configured to connect nodes A-C-B is indicated by links 402. A second sub-ring logically configured to connect nodes A-B-E is indicated by links 404. A third sub-ring logically configured to connect nodes E-C-D is indicated by links 406. Thus, the total number of rings, including 1 major ring and 3 sub-rings is R=4. Applying Formula 1 yields a first criteria that L≤7. Applying Formula 2 yields a second criteria that R≤3. Because first example 400 does not satisfy Formula 1 and Formula 2, it may be determined that first example 400 includes logical loops. Two cases of logical loops in first example 400 are A-D-C-A and B-E-D-C-B, which represent possible logical links using one link per ring. Specifically, logical loop A-D-C-A arises from links 408-3, 406-2, and 402-1, which are each portions of a different ring. Logical loop B-E-D-C-B arises from links 404-2, 408-2, 406-2, and 402-2, which are each portions of a different ring. Thus, certain combinations of idle and protecting states for the rings in first example 400 can lead to logical loops. It is noted that other logical loops may be identified in first example 400.

Referring now to FIGS. 5A, 5B, 5C, and 5D, network diagrams of selected elements of a second example 500 of logical loop identification is depicted. As shown, second example 500 may represent an embodiment of network 100. In second example 500, five nodes (F, G, H, J, K) represent network nodes. In second example 500, eight physical links are present and are configured in different logical topologies, as described in further detail below. It will be understood that other logical topologies may be implemented in different embodiments.

Figure 5A:
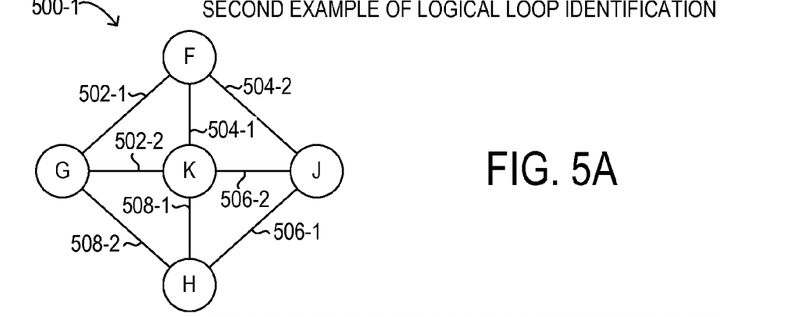
FIGS. 5A, 5B, 5C, and 5D are a network diagrams of selected elements of a second example of logical loop identification.

In FIG. 5A, eight (8) physical links (502-1, 502-2, 504-1, 504-2, 506-1, 506-2, 508-1, 508-2) are present between the 5 nodes in second example 500-1, and so, N=5 and L=8. In second example 500-1, nodes F-G-K are configured as a first sub-ring with links 502. Nodes K-F-J are configured as a second sub-ring with links 504. Nodes H-J-K are configured as a third sub-ring with links 506. Nodes G-H-K are configured as a fourth sub-ring with links 508. However, in second example 500-1, there is no major ring, but only sub-rings. Therefore, second example 500-1 does not satisfy G.8032 and does not have a suitable logical topology for logical loop determination, as described herein.

Figure 5B:
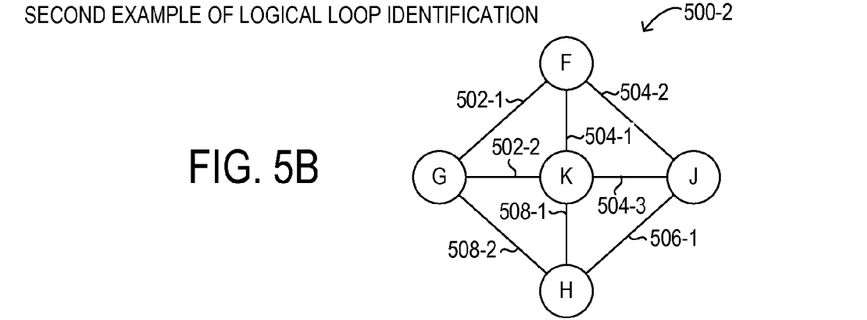

In second example 500-2 in FIG. 5B, link 506-2 has been reconfigured as link 504-3, forming major ring including nodes K-F-J and links 504. However, ring H-J-K has only one link 506-1, which is between nodes H-J. As a result, ring H-J-K is a degenerate ring that cannot support RPLs as defined by G.8032. Therefore, second example 500-2 does not satisfy G.8032 and does not have a suitable logical topology for logical loop determination, as described herein.

Figure 5C:
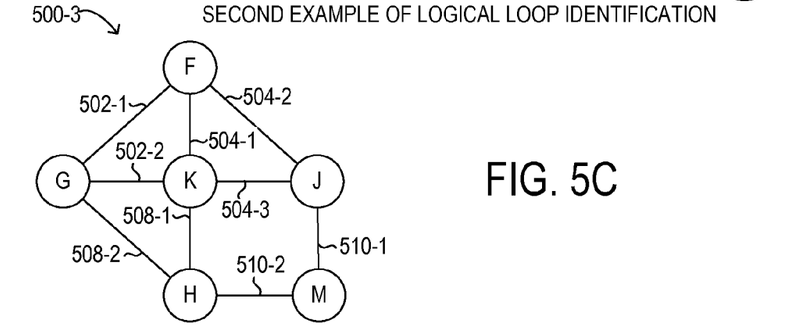

In second example 500-3 in FIG. 5C, link 506-1 has been removed with respect to second example 500-2 (see FIG. 5B) and a new node M has been added, along with link 510-1 between nodes J-M and link 510-2 between nodes H-M. Nodes F-K-J are configured as a major ring with links 504. Nodes F-G-K are configured as a first sub-ring with links 502. Nodes G-H-K are configured as a second sub-ring with links 508. Nodes H-M-J are configured as a third sub-ring with links 510. Accordingly, second example 500-3 has 1 major ring and 3 sub-rings. Thus, in second example 500-3, N=6 and L=9. Now, in second example 500-3, L=9, which is equal to 2*6−3=9 (as given by Formula 1), and R=4, which is equal to 6−2=4 (as given by Formula 2). Thus, second example 500-3 has not been determined to include logical loops and may be free of logical loops.

Figure 5D:
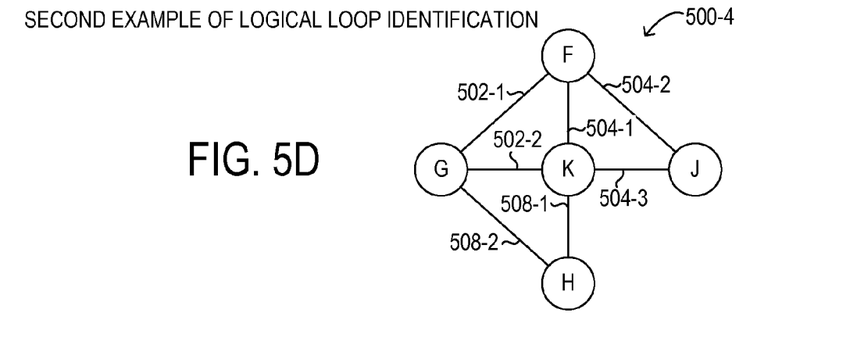

In second example 500-4 in FIG. 5D, link 506-1 has been removed with respect to second example 500-2 (see FIG. 5B), as an alternative to second example 500-3 (see FIG. 5C), for example, when no additional node M is available. Nodes F-K-J are configured as a major ring with links 504. Nodes F-G-K are configured as a first sub-ring with links 502. Nodes G-H-K are configured as a second sub-ring with links 508. Accordingly, second example 500-3 has 1 major ring and 2 sub-rings. Thus, in second example 500-4, N=5 and L=7. Now, in second example 500-4, L=7, which is equal to 2*5−3=7 (as given by Formula 1), and R=3, which is equal to 5−2=3 (as given by Formula 2). Thus, second example 500-4 has not been determined to include logical loops and may be free of loops.

Figure 6:
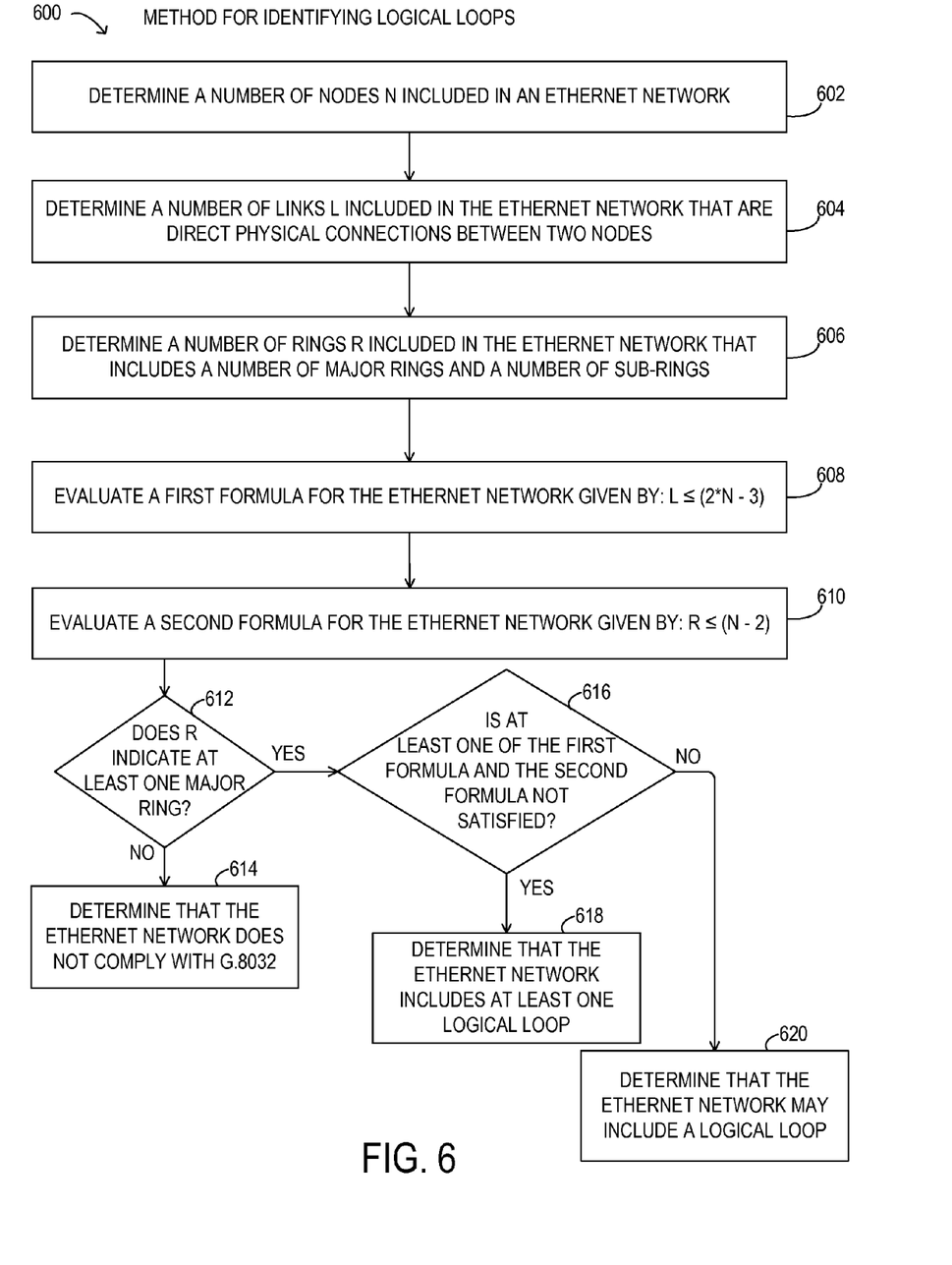
FIG. 6 is a flow chart of selected elements of a method for identifying logical loops.

Referring now to FIG. 6, a block diagram of selected elements of an embodiment of method 600 for identifying loops in an Ethernet network, as described herein, is depicted in flowchart form. Method 600 may be performed by control plane 200 (see FIG. 2) for network 100 (see FIG. 1). It is noted that certain operations described in method 600 may be optional or may be rearranged in different embodiments.

Method 600 begins by determining (operation 602) a number of nodes N included in an Ethernet network. A number of links L included in the Ethernet network that are direct physical connections between two nodes are determined (operation 604). A number of rings R included in the Ethernet network that includes a number of major rings and a number of sub-rings are determined (operation 606). A first formula for the Ethernet network, given by: L≤(2*N−3), is evaluated (operation 608). A second formula for the Ethernet network, given by R≤(N−2), is evaluated (operation 610). Then, a decision is made whether R indicates (operation 612) at least one major ring. When the result of operation 612 is NO, method 600 determines (operation 614) that the Ethernet network does not comply with G.8032. When the result of operation 612 is YES, a decision is made whether at least one of the first formula and the second formula is not satisfied (operation 616). When the result of operation 616 is YES, method 600 determines (operation 618) that the Ethernet network includes at least one logical loop. When the result of operation 612 is NO, method 600 determines (operation 620) that the Ethernet network may include a logical loop. Further analysis of the Ethernet network after operation 620 may determine that the Ethernet network is free of logical loops.

Referring now to FIG. 7, a block diagram of selected elements of an embodiment of method 700 for identifying loops in an Ethernet network, as described herein, is depicted in flowchart form. Method 700 may be performed by control plane 200 (see FIG. 2) for network 100 (see FIG. 1). It is noted that certain operations described in method 700 may be optional or may be rearranged in different embodiments.

Method 700 begins by determining (operation 702) a number of nodes N included in an Ethernet network. A number of links L included in the Ethernet network that are direct physical connections between two nodes are determined (operation 704). A number of rings R included in the Ethernet network that includes a number of major rings and a number of sub-rings are determined (operation 706). A formula for the Ethernet network, given by L≤R+(N−1), is evaluated (operation 710). Then, a decision is made whether R indicates (operation 712) at least one major ring. When the result of operation 712 is NO, method 700 determines (operation 714) that the Ethernet network does not comply with G.8032. When the result of operation 712 is YES, a decision is made whether the formula is not satisfied (operation 716). When the result of operation 716 is YES, method 700 determines (operation 718) that the Ethernet network includes at least one logical loop. When the result of operation 712 is NO, method 700 determines (operation 720) that the Ethernet network may include a logical loop. Further analysis of the Ethernet network after operation 720 may determine that the Ethernet network is free of logical loops.

As disclosed herein, a method and system for identifying logical loops in an Ethernet network may determine an number of nodes N and a number of links L between nodes. A number of rings R, including a number of major rings and a number of sub-rings for the Ethernet network may be determined. Specific formulas for the values for L, R, and N may be evaluated to determine when the Ethernet network includes logical loops.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for identifying logical loops in an Ethernet network, comprising:
    determining, based on discovery messages transmitted according to a discovery protocol among nodes included in the Ethernet network, the number of nodes N included in the Ethernet network, wherein N is at least 2;
    determining, based on the discovery messages, a number of links L included in the Ethernet network, wherein a link is a direct physical connection between two nodes, wherein L is at least 1;
    determining, based on the discovery messages, a number of rings R included in the Ethernet network, wherein the number of rings R includes a number of major rings and a number of sub-rings, wherein R is at least 0;
    determining a relationship for L using a first formula for the Ethernet network given by: L≤(2*N−3);
    determining a relationship for R using a second formula for the Ethernet network given by: R≤(N−2);
    when the number of rings R indicates at least one major ring and at least one of the first formula and the second formula is not satisfied, determining that the Ethernet network includes at least one logical loop; and
    when the Ethernet network includes at least one logical loop, performing, using a processor, until both the first formula and the second formula are satisfied, at least one of adding a node to the Ethernet network or removing a link from the Ethernet network.

2. A system for identifying logical loops in an Ethernet network, comprising:
    a non-transitory computer readable memory media;
    a processor configured to access the non-transitory computer readable memory media, wherein the memory media store processor-executable instructions, the instructions, when executed by a processor, cause the processor to:
    determine, based on discovery messages transmitted according to a discovery protocol among nodes included in the Ethernet network, the number of nodes N included in the Ethernet network, wherein N is at least 2;
    determine, based on the discovery messages, a number of links L included in the Ethernet network, wherein a link is a direct physical connection between two nodes, wherein L is at least 1;
    determine, based on the discovery messages, a number of rings R included in the Ethernet network, wherein the number of rings R includes a number of major rings and a number of sub-rings, wherein R is at least 0;
    determine a number of major rings M included in R;
    determine a relationship for L using a first formula for the Ethernet network, given by: L≤(2*N−3);
    determine a relationship for R using a second formula for the Ethernet network, given by: R≤(N−2);
    when M≥1 and at least one of the first formula and the second formula is not satisfied, determine that the Ethernet network includes at least one logical loop; and
    when the Ethernet network includes at least one logical loop, perform until both the first formula and the second formula are satisfied, at least one of adding a node to the Ethernet network or removing a link from the Ethernet network.

3. A method for identifying logical loops in an Ethernet network, comprising:
    determining, based on discovery messages transmitted according to a discovery protocol among nodes included in the Ethernet network, the number of nodes N included in the Ethernet network, wherein N is at least 2;
    determining, based on the discovery messages, a number of links L included in the Ethernet network, wherein a link is a direct physical connection between two nodes wherein L is at least 1;
    determining, based on the discovery messages, a number of rings R included in the Ethernet network, wherein the number of rings R includes a number of major rings and a number of sub-rings, wherein R is at least 0;
    determining a relationship for L and R using a formula for the Ethernet network, given by: L≤R+(N−1);
    when the number of rings R indicates at least one major ring and the formula is not satisfied, determining that the Ethernet network includes at least one logical loop; and
    when the Ethernet network includes at least one logical loop, performing, using a processor, until the formula is satisfied, at least one of adding a node to the Ethernet network or removing a link from the Ethernet network.

* * * * *

UNITED STATES PATENT AND TRADEMARK OFFICE
CERTIFICATE OF CORRECTION

PATENT NO.       : 9,647,893 B2
APPLICATION NO.  : 14/444165
DATED            : May 9, 2017
INVENTOR(S)      : David Michael Colven Page 1 of 1

It is certified that error appears in the above-identified patent and that said Letters Patent is hereby corrected as shown below:

On the Title Page

Column 1 under item (73): Before "Limited" please delete "Fujitsul" and insert -- Fujitsu --

Signed and Sealed this
Twenty-second Day of May, 2018

Andrei Iancu
*Director of the United States Patent and Trademark Office*